United States Patent [19]

Bradley

[11] 4,039,769

[45] Aug. 2, 1977

[54] INSTRUMENT AND METHOD FOR MEASURING ENVELOPE DELAY IN A TRANSMISSION CHANNEL

[75] Inventor: Frank R. Bradley, Bronx, N.Y.

[73] Assignee: Bradley Telcom Corporation, Leonia, N.J.

[21] Appl. No.: 679,350

[22] Filed: Apr. 22, 1976

[51] Int. Cl.$^2$ .............................................. H04B 3/46
[52] U.S. Cl. ........................ 179/175.3 R; 324/57 DE
[58] Field of Search ............ 179/175.3 R; 324/57 DE

[56] References Cited

U.S. PATENT DOCUMENTS

| | | | |
|---|---|---|---|
| 2,632,792 | 3/1953 | Selz | 179/175.3 R |
| 2,929,987 | 3/1960 | Noland et al. | 179/175.3 R |
| 2,970,258 | 1/1961 | Sinclair | 179/175.3 R |
| 3,119,062 | 1/1964 | Codd | 324/57 DE |

*Primary Examiner*—Douglas W. Olms

*Attorney, Agent, or Firm*—Gottlieb, Rackman & Reisman

[57] ABSTRACT

There are disclosed instruments and methods for measuring envelope delay in a transmission channel which entail the simultaneous transmission over the channel of both a modulated reference tone and a modulated variable test tone. Unlike the prior art, in which the transmissions of the reference tone and the test tone take place alternately on the channel of interest, or in which the reference tone is transmitted over a separate channel, in accordance with the invention there is no need either to employ a second channel or to switch back and forth between tone transmissions. At the receiving end, the modulation signal on each tone is detected. The two modulation signals are the same at the transmitting end, and their phases are compared at the receiving end to determine the envelope delay of the channel.

72 Claims, 4 Drawing Figures

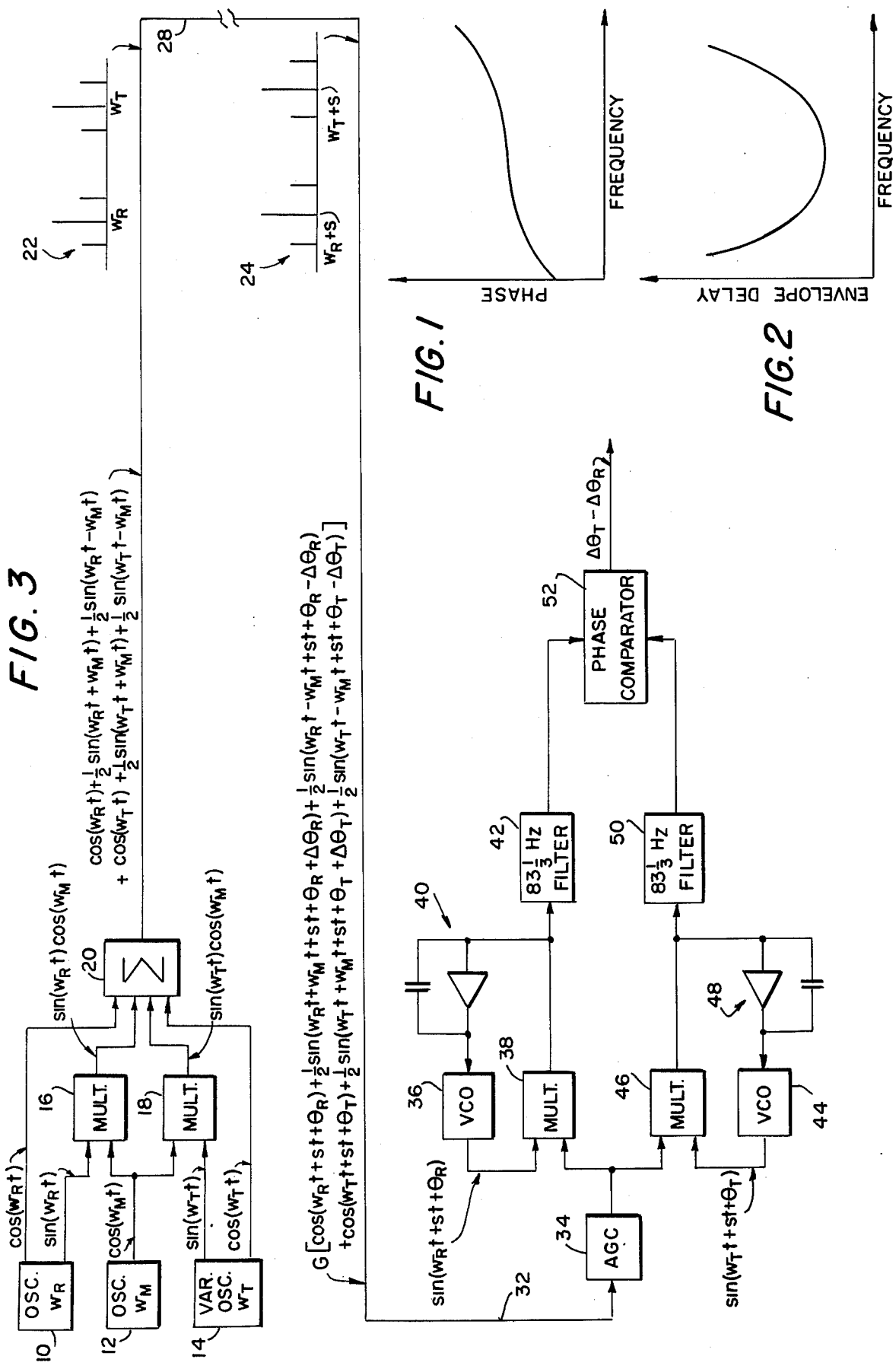

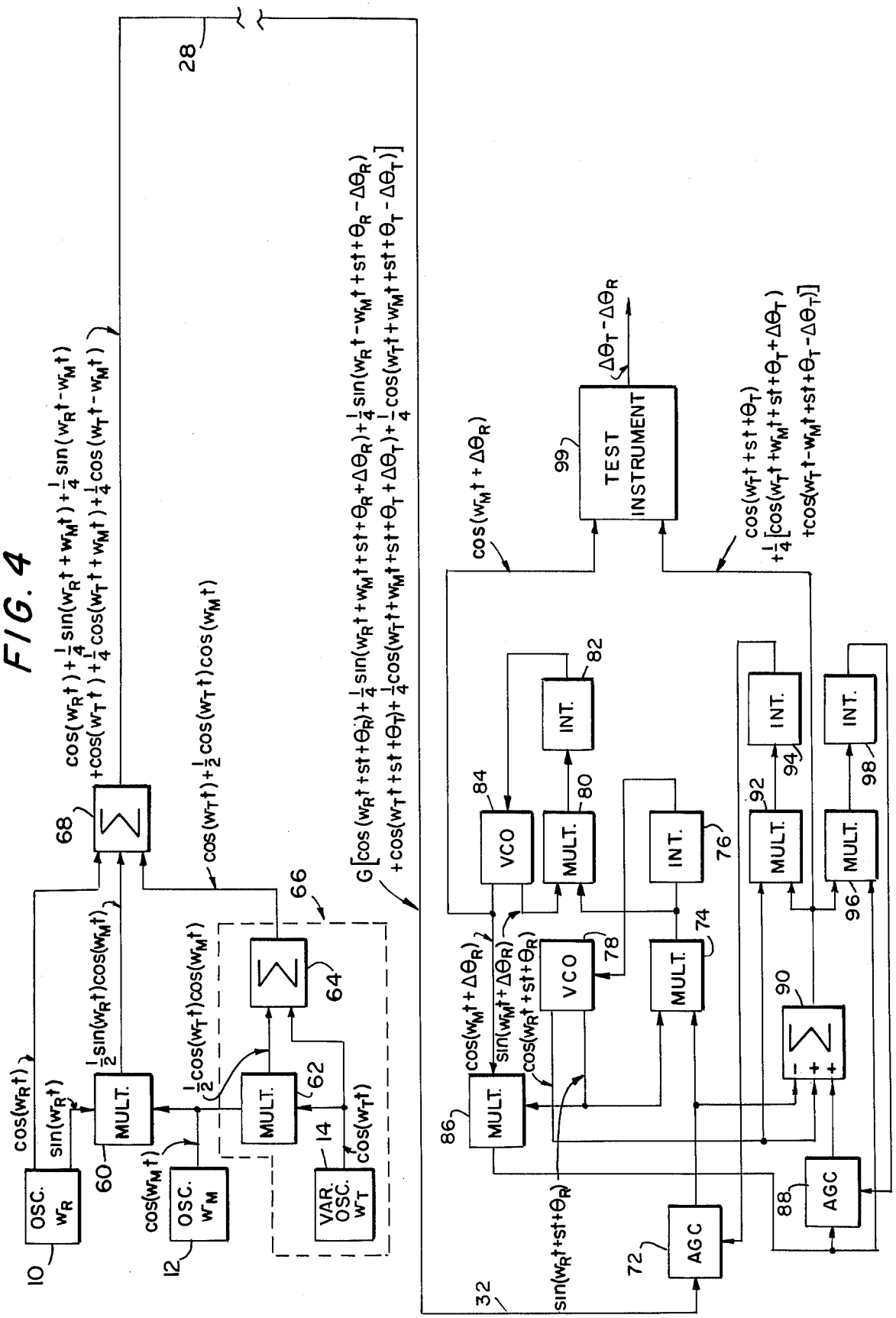

INSTRUMENT AND METHOD FOR MEASURING ENVELOPE DELAY IN A TRANSMISSION CHANNEL

This invention relates to instruments and methods for measuring the envelope delay in a transmission channel, and more particularly to instruments and methods for processing modulated reference and test tones which are transmitted simultaneously over the channel.

When a signal is sent down a transmission channel, the received signal will exhibit distortion if the different frequency components are delayed unequally. If the phase versus frequency (i.e., "phase-shift"), characteristic of the channel is linear and has an extrapolated DC intercept of zero, although the overall signal is delayed (due to the transmission time of the channel), there will be no distortion. This phase-shift characteristic means that if one frequency is N times another, then the phase shift of the first frequency will be N times the phase shift of the second. This, in turn, insures that the two signals at the receive end of the channel have the same relative timing that they have at the send end. Unfortunately, typical communication channels do not exhibit such a phase-shift characteristic, and this is particularly troublesome in data communications.

In order to measure phase shift, the measuring instrument must have available to it a reference; a phase shift can be determined only if there is something to which the received signal can be compared. The exact value of phase shift for each frequency is not usually of the utmost significance; what is important are the relative phase shifts. A phase shift is reflected in the time domain as a transmission delay. If the time delay for each frequency is the same, that is, the phaseshift characteristic is linear, all it means is that it takes a certain amount of time for a signal to travel down the channel, but it does so without distortion. How long it takes is usually of minor importance. Distortion results from different frequencies having different transmission times. Thus it is the relative time delays, or phase shifts, which are of primary interest.

For these reasons, instead of deriving a phase versus frequency plot, what is usually derived is a plot known as "envelope delay." There are transmitted down the channel not only a variable test carrier frequency but also a fixed reference carrier frequency (typically, 1700 or 1800 Hz). The same low-frequency signal (typically, 41-⅔ or 83-⅓ Hz) is used to modulate both the reference and the test tones. The modulation of each tone gives rise to sidebands. At the receive end, the phase shift between the reference tone and one of its sidebands is measured, and the phase shift between the test tone and one of its sidebands is measured. If each of these phase shifts is divided by the frequency difference between the carrier and the sideband, that is, the frequency of the modulating signal, there results in effect an approximation to the derivative of the phase-shift characteristic at the respective tone frequency. The envelope delay curve is basically a plot of the differences. The units of the envelope delay values are time units since each value represents a phase difference (radians) divided by a frequency (radians per second). The resulting plot is an approximation to the derivative of the phase-shift characteristic and it represents the time delay of each frequency as it travels down the channel. The information is relative only inasmuch as the time delay of each frequency is measured relative to that of the reference tone frequency.

To effect the measurement of envelope delay, it is thus necessary for some test instrument to have available both the modulated reference tone and the modulated variable test tone. This is often accomplished by sending the modulated test tone over the channel of interest, and the modulated reference tone over another channel between the same two points. This is not only troublesome, but on two-wire facilities to an isolated location it may not always be possible. Another approach is to switch back and forth between the reference and test tone frequencies and transmit them alternately over the same channel. This approach also suffers from several disadvantages, among them repeated resynchronization requirements.

It is a general object of my invention to provide instruments and methods for facilitating the measurement of envelope delay by the simultaneous transmission over the same channel of modulated reference and test tones.

It might be thought that both tones could be transmitted simultaneously and operated upon separately at the receive end by providing conventional filters to separate the two tones and their sidebands. One filter would pass only the reference tone and its sidebands to processing circuits which would determine the phase shift between the tone and one of its sidebands. Another filter would operate in a comparable manner on the variable test tone, this filter changing its center frequency in accordance with the test tone being transmitted at any given time. This approach, however, is not practical because conventional filtering introduces a phase shift which is not linear with frequency. The filter itself would introduce a phase shift between the respective tone which it passes and its sidebands. In other words, the filter envelope delay would be mixed with the channel envelope delay, and accurate channel phase-shift measurements would be precluded.

This problem is avoided in accordance with my invention by using multiplication and/or subtraction techniques, rather than conventional filtering techniques, for isolating the respective tones with their sidebands. As described in my U.S. Pat. No. 3,814,868, entitled "Telephone Line Characteristic Measuring Instrument" which issued on June 4, 1974, by using multiplication and/or subtraction techniques (e.g., by employing frequency/phase lock loops), it is possible to "notch" out a tone and its sidebands from an overall signal. In effect, an almost perfect "frequency aperture" can be created, and one such aperture can be used for each tone and its sidebands. Alternatively, tracking filter techniques, as described in my copending application Ser. No. 661,106 filed on Feb. 25, 1976 and entitled "Instruments and Methods for Measuring Characteristics of Only a Selected Portion of a Transmission Channel," may be used for the same purpose.

There are numerous test instruments in the field both for transmitting and operating upon modulated test tones. These instruments, by themselves, cannot be used to practice the method of my invention, because the overall test signal which is transmitted in accordance with the invention is different, and different instrumentation is required to process it at the receive end of the channel. In one embodiment of my invention, equipment is provided which can work in conjunction with conventional test transmitters, and additional equipment is provided which can work with conventional receive test systems. By adding additional circuits to conventional test equipments, i.e., by retrofitting them, it is possible to practice the principles of my invention without necessitating the scrapping of existing — and expensive — equipments.

Further objects, features and advantages of my invention will become apparent upon consideration of the following detailed description in conjunction with the drawing, in which:

FIG. 1 depicts the general form of a phaseshift characteristic;

FIG. 2 depicts the general form of an envelope delay characteristic;

FIG. 3 depicts a first illustrative embodiment of my invention; and

FIG. 4 depicts a block-diagram schematic of a second illustrative embodiment of my invention, one which allows use of existing envelope delay measurement measurement instruments.

FIGS. 1 and 2 depict respectively phase and envelope delay characteristics, whose general forms are well known to those skilled in the art. The envelope delay curve represents the derivative of the phase-shift curve. In taking the derivative of any curve, "constants" are lost. Thus the envelope delay plot represents relative delays between frequencies, as described above.

FIG. 3 depicts a test set-up which can be employed in accordance with the principles of my invention. (Although it is designed for testing of voiceband channels, the principles of the invention are applicable to any type of channel and for any frequency band of interest.) The upper half of the circuit represents the instrument at the send end 28 of the channel, and the lower half of the circuit represents the instrument at the receive end 32 of the same channel. Variable oscillator 14 derives quadrature test tone signals, the test tone usually varying over several kHz. The symbol $w_T$ represents the frequency of the test tone. A low-frequency oscillator 12 generates a modulating signal, typically at 83⅓ Hz, although to cover the general case the frequency is designated $w_M$. The $\sin(w_T t)$ and $\cos(w_M t)$ signals are extended to multiplier 18 which derives a quadrature-modulated signal of the form $\sin(w_T t)\cos(w_M t)$. The frequency spectrum of the product consists of two sidebands, at frequencies $(w_T + w_m)$ and $(w_T - w_M)$.

The output of multiplier 18 and the $\cos(w_T t)$ output of oscillator 14 are extended to respective inputs of summer 20. The overall signal on channel 28 consists of six terms as indicated in FIG. 3, the last three of which are derived from multiplier 18 and oscillator 14. The first of the last three terms is simply the $\cos(w_T t)$ signal from variable oscillator 18. The last two terms are derived from the multiplier. Although the output of the multiplier is $\sin(w_T t)\cos(w_M t)$, using the trigonometric equality $\sin(A)\cos(B) = (\frac{1}{2})\sin(A - B) + (\frac{1}{2})\sin(A + B)$, the output of the multiplier can be re-written as two terms, the last two of the six components of the overall signal applied to channel 28. It will be noted that these two terms have respective frequencies of $(w_T + w_M)$ and $(w_T - w_M)$, i.e., they are the $w_M$ sidebands of the carrier frequency. Thus what is transmitted as half of the overall signal is a variable test tone frequency of the form $\cos(w_T t)$ and two sidebands.

In accordance with my invention, a reference tone with two sidebands is also transmitted over the same channel. It is elements 10, 12 and 16 which control the application of the additional three-component signal to channel 28. Oscillator 10 generates a fixed reference tone of frequency $w_R$. The oscillator cosine signal is applied to one input of summer 20, and its sine signal is applied to one input of multiplier 16. The modulating signal at the output of oscillator 12 is applied to the other input of multiplier 16, and the multiplier output — two sidebands at respective frequencies $(w_R + w_M)$ and $(w_R - w_M)$ — is applied to an input of the summer. Although the output of the modulator is of the form $\sin(w_R t)\cos(w_M t)$, using the above equality, this expression can be broken down into two terms. There thus results from oscillator 10 and multiplier 16 another three terms in the overall signal applied to channel 28, these three terms being the first three of the six-term expression of the overall signal shown in FIG. 3 as being applied to channel 28. The reference tone and its sidebands are of the exact same form as that of the test tone and its sidebands.

Waveform 22 in FIG. 3 represents the frequency spectrum of the signal applied to channel 28. It consists of two carrier frequencies $w_R$ and $w_T$, each having a pair of sidebands, one at a frequency $w_M$ above the carrier and another at a frequency $w_M$ below it.

During the transmission along the channel, each of the six components in the applied signal is distorted. Only the distortions of interest are set forth in the expressions on FIG. 3 for the six component signals received at the far end of the channel, the far end being represented by the numeral 32. Each of the six tone components is attenuated by the factor G, which is frequency dependent, and is shifted in frequency by the same small increment $s$, this being a "translation frequency" which may result from the multiplexing and demultiplexing operations at the respective ends of the channel. The phase of the reference tone is shifted by an angle $\theta_R$. Thus the received reference tone is of the form $\cos(w_R t + st + \theta_R)$. The upper sideband of the reference tone is similarly shifted by the angle $\theta_R$. But because the upper sideband is different than the reference tone, there is an additional increment of phase shift represented by $\Delta\theta_R$. (It is this $\Delta\theta_R$ increment which is the value of interest.) The form of the received upper sideband is thus $(\frac{1}{2})\sin(w_R t + w_M t + st + \theta_R + \Delta\theta_R)$.

The third term in the expression which represents the received signal is similar to the second. However, because the two sidebands are on opposite sides of the reference frequency, the lower sideband has a phase shift in the opposite direction. Consequently, its phase shift is $(\theta_R - \Delta\theta_R)$. The change in phase shift for the upper sideband relative to the tone, and the change in phase shift of the lower sideband relative to the tone, are equal and opposite only if the phase-shift characteristic is linear. Otherwise, the two incremental phase shift values are different. However, for the low modulating frequency $w_M$ which is typically used when measuring envelope delay, the phase-shift characteristic over the interval $2w_M$ is fairly linear and it is assumed that the incremental phase shifts are equal and opposite in sign. (This is the assumption usually made in telephony.)

In a similar fashion, the last three terms in the expression for the overall received signal are modified. The variable test tone signal is shifted by an angle $\theta_T$. Each of its sidebands is shifted by the same angle, but the upper sideband has a phase shift $\Delta\theta_T$ in the opposite direction from the lower sideband. It is the $\Delta\theta_T$ value which is of interest when measuring envelope delay. The envelope delay at any frequency $w_T$, relative to the reference frequency, is equal to the difference between $\Delta\theta_T$ and $\Delta\theta_R$, divided by $w_M$.

Waveform 24 represents the freqency spectrum of the overall signal received at the far end of the channel. It is the same as the frequency spectrum of the signal which is transmitted, except that all of the signal may be shifted upward in frequency by the value s. (The other changes in the six components relate to phase shifts, and these are not represented in the frequency spectrum.)

At the receive end of the channel, the incoming signal is operated upon by automatic gain control circuit 34. This circuit simply amplifies the incoming signal so that it has a level (assumed to be unity in the following analysis) sufficient for the proper operation of multipliers 38 and 46. The exact level is not important. Although for convenience of notation it is assumed below that the outputs of voltage controlled oscillators 36 and 44 are at the same level (unity) as those of the two carrier frequencies, it will become apparent that the important parameters in the analysis of the operation of the multipliers, as well as filters 42 and 50, are the various frequencies of the sine and cosine signals to be considered. It is assumed hereinafter that the oscillator outputs are at the same levels as the frequencies since this simplifies the mathematics and the assumption, even if not true, does not affect the circuit operation. (The only effect of different levels is on the magnitude of the outputs of the two filters, and this is also of no importance inasmuch as phase comparator 52 simply responds to the difference in the phases of the two signals applied to its inputs.)

The output of voltage controlled oscillator 36 is a signal of the form $\sin(w_R t + st + \theta_R)$, for reasons which will soon become apparent. Multiplier 38 uses this signal to multiply each of the six component terms in the signal at the ouput of automatic gain control circuit 34. The last three components have respective frequencies of $w_T$, $(w_T + w_M)$ and $(w_T - w_M)$. Recalling the equalities $\sin(A)\cos(B) = (\frac{1}{2})\sin(A-B) + (\frac{1}{2})\sin(A+B)$ and $\sin(A)\sin(B) = (\frac{1}{2})\cos(A-B) - (\frac{1}{2})\cos(A=B)$, it is apparent that the multiplication gives rise to six signals of frequencies $(w_r - w_T)$, $(w_R + w_T + 2s)$, $(w_R - w_T - w_M)$, $(w_R + w_T + w_M + 2s)$, $(w_R - w_T + w_M)$ and $(w_R + w_T - w_M + 2s)$.

Integrator 40 (consisting of an operational amplifier with a capacitor in the feedback path) functions as a low-pass filter, passing frequencies no higher than several Hz (e.g., 5 Hz). Of the six frequencies, only the first, third and fifth can give rise to frequencies this low, namely, when $w_T \simeq w_R$, $w_T \simeq w_R - W_M$ or $w_T \simeq w_R + w_M$. Typical values for $w_R$ and $w_M$ are respectively 1700 Hz and 83-$\frac{1}{3}$ Hz. Values for $w_T$ within only three small ranges of a few Hz, centered respectively around $w_R$, $w_R - w_M$, and $w_R + w_M$, can give rise to a signal at the output of the integrator as a result of the multipliction of the last three components of the overall signal on conductor 32 by the output of oscillator 36. The upper half of the receive circuit of FIG. 3 is to operate such that the last three terms of the overall signal on conductor 32 do not affect the frequency of oscillator 36. This is achieved by not transmitting a test frequency $w_T$ which is within a few Hz of either the reference frequency $w_R$ or it sidebands.

The multiplication of the output of oscillator 36 by the last three terms in the overall received signal gives rise, as described above, to six frequencies $(w_R - w_T)$, $(w_R + w_T + 2s)$, $(w_R - w_T - w_M)$, $(w_R + w_T + w_M + 2s)$, $(w_R - w_T + w_M)$ and $(w_R + w_T - w_M + 2s)$. Filter 42 passes only frequencies which are within a few Hz of $w_M$, where $w_M = 83$-$\frac{1}{3}$ Hz in the illustrative example. (The filter itself is the same as those used in prior art instruments, the bandpass being dependent on considerations such as signal-to-noise ratio, settling time, etc.) It is only when one of the six frequencies is within a few Hz of $w_M$ that it is reflected in the filter output. Since these frequencies should not affect the filter output (the upper half of the receive circuit is designed to operate only on $w_R$ and its sidebands), there are six small ranges of combinations of $w_R$, $w_T$, $w_M$ and s which are to be avoided. These are determined by the following six equations: $|w_M| = |w_R - w_T|$; $|w_M| = |w_R + w_T + 2s|$; $|w_M| = |w_R - w_T - w_M|$; $|w_M| = |w_R + w_T + w_M + 2s|$; $|w_M| = |w_R - w_T + w_M|$; and $|w_M| = |w_R - w_T - w_M + 2s|$. Since we are concerned with frequencies within a few Hz of $w_M$, and the term 2s is itself at most a few Hz in a typical transmission facility, the terms 2s can be ignored in determining the small ranges of $w_T$ which should not be transmitted (for any given value of $w_R$). The values of $w_T$ which should not be transmitted are thus $(w_R)$, $(w_R - w_M)$, $(w_R - 2w_M)$, $(w_R + w_M)$ and $(w_R + 2w_M)$. Thus while for the proper operation of oscillator 36 the impermissible values for $w_T$ are centered around $(w_R)$, $(w_R - w_M)$ and $(w_R + w_M)$, it is seen that there are two additional small ranges of frequencies centered around $(w_R - 2w_M)$ and $(w_R + 2w_M)$ which cannot be transmitted when the operation of filter 42 is taken into account.

Assuming that at the transmitting site $w_T$ is varied without having values within a few Hz of the five center frequencies just described, it is only the first three terms of the overall signal on conductor 32 which, after multiplication by the output of oscillator 36, give rise to components which affect the operation of the upper half of the circuit at the receive end of the channel.

Assume that the oscillator output is $\sin(w'_R t + \theta'_R)$, where $w_R'$ is slightly different from $(w_R + s)$. (The object of the feedback circuit is to cause $w'_R$ to equal $(w_R + s)$, and $\theta'_R$ to equal $\theta_R$.) When the first term in the signal on conductor 32 — $\cos(W_R t + st + \theta_R)$ — is multiplied by $\sin w'_R t + \theta'_R)$, there results an expression having two terms: $(\frac{1}{2}) \sin(w'_R t + \theta'_R - w_R t - st - \theta_R) + (\frac{1}{2}) \sin(w'_R t + st + \theta_R)$. The second term has a frequency too high for passage through either integrator 40 or filter 42 and can therefore be ignored. The first term is passed through the integrator which functions a an averager with high DC gain. The effect of the feedback loop is to cause the input to the integrator to have no low-frequency component, i.e., the voltage controlled oscillator is caused to operate such that $w'_R$ tracks $(w_R + s)$, $\theta_R'$ tracks $\theta_R$. Multiplier 38, integrator 40 and voltage controlled oscillator 36 comprises a frequency-phase lock loop for deriving a signal $\sin(w_R t + st + \theta_r)$ in response to an incoming $\cos(w_R t + st + \theta_R]$signal. Although the $(\frac{1}{2}) \sin(w'_R t + \theta'_R - w_R t - st - \theta_R)$ component at the multiplier output controls the frequency of oscillator 36, it does not appear at the output of filter 42 since its frequency (which if it tends to vary from zero is returned back to zero by the loop) is not within a few Hz of $w_M$.

When the second term in the overall signal on conductor 32 is multipied by the oscillator output (assuming a frequency of $w_R s$ and a phase of $\theta_R$), and using the identity $\sin(A) \sin(B) = (\frac{1}{2})\cos(A - B( - (\frac{1}{2})\cos(A + B)$, there results the following expression: $(\frac{1}{2})\cos(w_R t + st + \theta_R - w_R t - w_M t - st - \theta_R - \Delta \theta_R) - \frac{1}{2})\cos(w_R t + st + \theta_R + w_R t + w_M t + st + \theta_R + \Delta \theta_R) = (\frac{1}{2})\cos(-w_M t - \Delta \theta_R) - (\frac{1}{4})\cos(2w_R t + 2st + w_m t + 2\theta_R + \Delta \theta_R)$. The second term has a frequency too high for passage by either the integrator or the filter. The effective signal is thus simply $(\frac{1}{4})\cos(-w_M t - \Delta\theta_R)$. Since $\cos(A)=\cos(-A)$, the effective signal is $(\frac{1}{4})\cos(w_M t + \Delta\theta_R)$.

Similarly, the third term in the overall signal on conductor 32 gives rise to a multiplier output of $$(\frac{1}{4})\cos(w_R t+st+\theta_R-w_R t+w_M t-st-\theta_R+\Delta\theta_R) - (\frac{1}{4})$$
$$\cos(w_R t+st+\theta_R+w_R t-w_M t+st+\theta_R-\Delta\theta_R) =(\frac{1}{4})$$
$$\cos(w_M t+\Delta\theta_R)$$
$$-(\frac{1}{4})\cos(2w_R t+2st-w_M t+2\theta_R-\Delta\theta_R).$$

The second term has a frequency too high to affect the operation of either the integrator or the filter, and the net effective contribution of the third term in the overall signal at the multiplier output is simply $(\frac{1}{4})\cos(w_M t + \Delta\theta_R)$.

The sum of the two effective contributions at the output of multiplier 38 is thus $(\frac{1}{2})\cos(w_M t + \Delta\theta_R)$. While this signal of frequency $w_M$ has no effect on the integrator output (the integrator passing only frequencies below approximately 5 Hz), the signal is passed through filter 42 whose center frequency is $w_M$. Thus one input to phase comparator 52 is a signal of the form $(\frac{1}{2})\cos(w_M t + \Delta\theta_R)$.

In a similar manner, voltage controlled oscillator 44 generates a signal of the form $\sin(w_T t+st+\theta_T)$. This oscillator operates at the frequency of the variable tone (as modified by the frequency translation), rather than at the frequency of the reference tone. The oscillator, together with multiplier 46, ingetrator 48 and filter 50, generates a signal at the output of the filter of the form $(\frac{1}{2})\cos(w_M t + \Delta\theta_T)$. The analysis of the operation of the bottom half of the circuit at the receive end of the channel is identical to the analysis presented above for the top half, except that the subscripts R and T are interchanged.

Phase comparator 52 operates on its two input signals, which signals have identical frequencies but different phases, to derive an output which is proportional to the phase difference, i.e., $\Delta\theta_T - \Delta\theta_R$. It is this quantity which, after division by $w_M$, is used as the measure of the envelope delay at the frequeny $w_T$.

As explained above, during any test sequence, $w_T$ should not be within any of the five small frequency ranges centered around $(w_R)$, $(w_R+w_M)$, $(w_R-w_M)$, $(w_R+2w_M)$ and $(w_R-2w_M)$. Where $w_T$ too close to any of these five frequencies, the tones and/or their sidebands would interfere and produce low-frequency beats which would otherwise confuse the instrumentation. Rather than to carefully avoid transmitting test frequencies within five ranges as oscillator 14 is swept across the frequency band of interest, a simpler procedure can be emloyed. It entails sweeping oscillator 14 through part of its range while a first reference frequency is transmitted, and sweeping the oscillator through the other part of its range while a second reference frequency is transmitted. For example, the first reference frequency may be 1700 Hz. When this reference frequency is transmitted, $w_T$ is swept through the lower part of the voiceband. The highest value of $w_T$ which can be transmitted before beat frequencies confuse the instrumentation is approximately $(w_R-2w_M)$, or a frequency a little above 1500 Hz (where $w_M=83 - \frac{1}{3}$ Hz). What is done is to vary $w_T$, either continuously or in small steps, from the low end of the voiceband until approximately 1350 Hz. Thereafter, the reference frequency may be switched to 1000 Hz. In such a case, the lowest value of $w_T$ which can result in interfering beats is a frequency of approximately $(w_R+2w_M)$, i.e., a frequency a little below 1200 Hz. By continuing to sweep the test frequency upwards starting at 1350 Hz, there is no possibility of interference. Thus all that is required is to use the higher reference frequency while the test frequency is swept through the lower part of the voiceband, and to use the lower reference frequency while the test frequency is swept through the upper part of the voiceband.

When switching from a reference frequency of 1700 Hz to a reference frequency of 1000 Hz, the same transmission of a 1350-Hz test frequency may result in different outputs from the phase comparator since the value of $\theta_R$ varies with the reference frequency. Since the envelope delay plot represents relative information in the first place, and the absolute value of phase shift at any carrier frequency is unimportant, when switching from one reference frequency to another the offset control of the phase comparator may be adjusted to give identical readings. In other words, as soon as the reference frequency is switched from 1700 Hz to 1000 Hz, the offset control of the phase comparator should be changed manually or automatically so that with a test frequency of 1350 Hz, the output reading is identical to that obtained for the same test frequency with the earlier-used reference frequency. Thereafter, the test frequency is swept through the upper part of the voiceband. This adjustment simply relates all of the measurements taken for the second reference frequency to the first-used reference frequency; it is as though two disjointed parts of the overall envelope delay plot were moved upward or downward so that their end points at 1350 Hz are coincident. (If the output of the phase comparator when $w_T=1350$ Hz is not manually shifted when the reference frequency is switched, the "true" envelope delay curve can be obtained simply by algebraically shifting the results so that the disconnected parts of the curve are made continuous.)

This switching between reference frequencies is not necessary at all if the envelope delay is not to be measured throughout the entire band; in such a case, by selecting a sufficiently high or low reference frequency, there will be no interfering beats. It is also possible, when $w_T$ is to be varied throughout the voiceband, to automatically control the switching of the reference frequency at the transmitting end, for example, for voiceband when $w_T$ reaches 1350 Hz. Alternatively, it is possible not to switch the reference frequency, and to build into the transmitting circuits instrumentation for automatically preventing the transmission of test frequencies within the range of the five center frequencies which produce interfering beats.

The frequency/phase lock loop comprising elements 36, 38 and 40 may have a narrow range of frequencies for both acquisition and tracking. (In the event the reference frequency is switched, the center frequency in both the acquisition and tracking ranges may be switched manually from approximately 1700 Hz to 1000 Hz.) The frequency/phase lock loop comprising elements 44, 46, and 48 must necessarily have a much wider range of frequencies for both acquisition and tracking since $w_T$ may vary over the voiceband. To start the test sequence, a test frequency may be transmitted without a reference frequency, the test frequency being remote from the reference frequency to be used. In such a case, the $w_T$ loop acquires the test frequency and continues to track it. Thereafter, the reference frequency is applied to the channel together with the test frequency, and the $w_R$ loop acquires the reference frequency and continues to track it. After both loops have acquired their respective frequencies, $w_T$ is varied as described above, either continuously or in small steps. The same acquisition procedure is followed after $w_T$ has been swept through the first part of the voiceband and the reference frequency is switched The frequency/phase lock loops and the filters in both the upper and lower parts of the circuit at the receive end of the channel allow operations to be performed on the two respective carrier frequencies $w_R$ and $w_T$ and their sidebands even though they are transmitted simultaneously over the channel. Each loop tracks a respective carrier frequency and in effect demodulates the carrier frequency to derive the modulating signal at a respective phase angle. Each of the loops operates on only its respective carrier frequency and sidebands, and does so without introducing distortion on the demodulated signal. It should be noted that in the system of FIG. 3, the modulation of both the reference tone frequency and the test tone frequency is of a form known as quadrature modulation; in each case, the modulating signal $\cos(w_T t)$ is in quadrature with the carrier signal, $\sin(w_R t)$ or $\sin(w_t t)$. Quadrature modulation of the double-frequency signal results in a simpler detection scheme when using phase lock methods than that required when conventional amplitude modulation is used. Amplitude modulation is equally convenient to phase modulation when tracking filter methods are used in separating the signals.

Conventional envelope-delay measurements are made using an amplitude-modulated variable-frequency test tone, rather than a quadrature-modulated variable-frequency test tone. Typical test instruments for operating on the received test tone utilize square-law detectors for separating the modulation from the tone. It would be desirable in those cases where prior art instruments are available to use them if possible. The system of FIG. 4 permits conventional test instruments to be utilized in accordance with the principles of the present invention.

At the transmitting site, a conventional test instrument 66 is utilized. This instrument generates a signal consisting of the test tone carrier frequency, with 50% amplitude modulation. The amplitude modulation component is generated by multipler 62 which multiplies the output of oscillator 12 by the output of variable oscillator 14. The output of the multiplier and the output of oscillator 14 are added together by summer 64, and the conventional transmitting test instrument output is applied to one input of summer 68.

Rather than to transmit a reference carrier frequency and its sidebands over another channel, or to transmit it over the same channel but alternating with the test carrier frequency and its sidebands, the additional circuitry at the transmitting end of the channel of FIG. 4 generates a quadrature-modulated reference carrier frequency and adds its to the output of instrument 66 for simultaneous transmission over the channel to be tested. The outputs of oscillators 10 and 12 are multiplied by multiplier 60 (which also introduces the scale factor of ½), and the output of the multiplier is applied to one of the inputs of summer 68. The reference carrier frequency itself is applied to another input of the summer. The output of the summer, the overall signal applied to channel 28, consists of six terms. Aside from different scale factors for the sidebands, the signal applied to channel 28 in the system of FIG. 4 is similar to that applied to the channel in the system of FIG. 3. The major difference is that while the reference carrier and its sidebands are of the same form in both systems, the sidebands of the test carrier frequency are different. In the system of FIG. 3, the test carrier is quadrature modulated, while in the system of FIG. 4 it is amplitude modulated. Although quadrature modulation allows for relatively simple detection schemes at the receive end of the channel, because existing equipments are designed to operate on amplitude-modulated test carrier frequencies, the system of FIG. 4 provide for the transmission of such a signal.

At the receive end of the channel, a conventional test instrument 99 is employed. This test instrument requires two input signals. The upper input is simply the modulating signal, phase shifted by $\Delta\theta_R$. This signal, in the prior art, is not derived from a reference carrier and sidebands which are transmitted simultaneously over the same channel with the test carrier and its sidebands. However, in accordance with the principles of the invention, this simultaneous transmission over the same channel does take place. The "new" circuitry between the channel and the two inputs of the prior art test instrument derives the two signals required by the test instrument. The first is the modulating signal, phase shifted by a number of degrees equal to the phase shift between the received reference carrier frequency and one of its sidebands.

The second signal extracted from the overall received signal on the channel and applied to the second input of the prior art test instrument is the conventional test carrier frequency with its amplitude-modulated sidebands.

The test instrument operates as it does in the prior art to derive the envelope delay at the test carrier frequency. (The method of transmitting two reference carrier frequencies, while sweeping the test carrier frequency through upper and lower ranges, is also advantageously employed when using the system of FIG. 4). It is the circuitry between the receive end of the channel and the prior art test instrument that derives the two signals required by the test instrument, even though all of the signals involved in the testing sequence are transmitted simultaneously over the channel of interest.

The received signal is of the form shown in FIG. 4. It is comparable to the received signal shown in FIG. 3 except that the last two terms are cosine terms rather than sine terms due to the amplitude modulation of the test carrier frequency rather than its quadrature modulation.

Multiplier 74, integrator 76 and voltage controlled oscillator 78 perform the same functions performed by multiplier 38, integrator 40 and voltage controlled oscillator 36 in the system of FIG. 3. Assuming that the test carrier which is transmitted is not within a few Hz of either the reference carrier or its first and second sidebands, so as to avoid interfering beat frequencies, the feedback loop consisting of elements 74, 76 and 78 responds to the reference carrier frequency and its sidebands. The loop functions to pull the DC signal at the input of integrator 76, and this in turn controls the frequency of oscillator 78 to be equal to $(W_R+s)$ and its phase to be equal to $\theta_R$. Although only the sine signal is required from oscillator 78 insofar as the frequency control is concerned, the cosine signal is required for other purposes as will be described below, and two signals in quadrature are generated by the oscillator. It should be noted that the received signal is operated upon by automatic gain control circuit 72 whose level is not absolute as is that of automatic gain control circuit 34 in the system of FIG. 3. The level of the output of automatic gain control circuit 72 is controlled for other reasons in the system of FIG. 4 which will become apparent below. But as described in connection with FIG. 3, the operation of the voltage controlled oscillator for generating a signal at the same frequency and phase as those of the received reference carrier is not dependent upon the relative levels of the two signals at the inputs of the multiplier in the frequency/phase lock loop.

Multiplier 89, integrator 82 and voltage controlled oscillator 84 operate in a manner comparable to the operation of multiplier 74, integrator 76 and voltage controlled oscillator 78. If the six components in the overall received signal are multiplied by the $\sin(w_R t + st + \theta_R)$ signal at the output of oscillator 78, and each of the sine-sine or sine-cosine signals is expanded into two separate terms, the resulting signal at the output of multiplier 74 consists of 12 terms. Utilizing the same kind of mathematical analysis set forth in the description of the system of FIG. 3, it can be shown that multiplier 80, integrator 82 and voltage controlled oscillator 84 result in the generation by the oscillator of a signal of the form $(w_M t + \Delta\theta_R)$, as shown in the drawing. Only one of the 24 component terms at the output of multiplier 80 affects the operation of oscillator 84. (The 12-term signal at the output of multiplier 74, after multiplication by multiplier 80, result in a 24-term signal.) The frequencies of the other terms in the signal are either too high for passage through integrator 82, or if they would otherwise be low enough, they result from the test carrier frequency being within a small range of the reference carrier frequency and its two upper and two lower sidebands (which condition does not arise due to the constraints placed on the test carrier frequency). The only component at the output of multiplier 74 which has an effect on the operation of the loop consisting of elements, 80, 82 and 84 is the component $\cos(w_M t + \Delta\theta_R)$. The loop operates so as to control a DC null at the input of integrator 82, and this in turn requires that oscillator 84 generate a signal of the form $\sin(w_M t + \Delta\theta_R)$. The oscillator, in addition to generating this signal, generates the same signal phase shifted by 90°. It is this signal — $\cos(w_M t + \Delta\theta_R)$ — which is extended to one input of the prior art test instrument 99. This same signal is extended to one input of multiplier 86.

Multiplier 86 multiplies the $\cos(w_M t + \Delta\theta_R)$ signal by the $\sin(w_R t + st + \theta_R)$ signal at the output of oscillator 78. The resulting signal is amplified by automatic gain control circuit 88 and applied to a first positive input of summer 90. The $\cos(w_R t + st + \theta_R)$ output of oscillator 78 is applied to the second positive input of the summer, and the output of automatic gain control circuit 72 is applied to the negative input of the summer. The output of the summer is extended to one input of each of multipliers 92 and 96. The respective multipliers have their other inputs connected to an output of oscillator 78 and the output of multiplier 86. Integrators 94 and 98 operate on the respective multiplier outputs to control the respective gains of automatic gain control circuits 72 and 88.

The lower half of the circuitry at the receive end of the system in FIG. 4 is designed to subtract out of the overall received signal the reference carrier frequency and its sidebands. By utilizing the same kind of analysis as presented above, and bearing in mind that the integrators pass frequencies of only a few Hz and that the test carrier frequency is controlled such that there are no interfering low-frequency beats with the reference carrier frequency and its sidebands, it can be shown that multiplier 92 and integrator 94 control the gain of automatic gain control circuit 72 such that at the output of summer 90 there is no reference carrier component. Similarly, multiplier 26 and integrator 98 control the gain of automatic gain control circuit 88 such that there are no reference carrier sideband frequencies at the output of the summer. The net result is that the summer output is of the form shown at the second input to test instrument 99 — the test carrier frequency with its amplitude-modulated sidebands. The fact that the test carrier frequency and its sidebands are translated by the frequency $s$ if of no moment and has no effect on the operation of test instrument 99; The test instrument derives the difference $\Delta\theta_T - \Delta\theta_R$.

The advantage of the system of FIG. 3 is that the detection scheme at the receive end of the channel is relatively simple due to the fact that both carrier frequencies are quadrature modulated. But conventional test instruments cannot be employed. The advantage of the system of FIG. 4, in which the test carrier frequency is amplitude modulated as in the prior art, is that at least part of the instrumentation, especially at the receive end of the channel, can consist of a conventional test instrument. Thus in those cases where prior art instruments are not available in the first place, it is preferred to use a system of the type shown in FIG. 3. In those cases where prior art instruments are available, it is more cost effective to utilize the conventional test instruments but to add to the system the additional elements shown in FIG. 4.

Although the invention has been described with reference to particular embodiments, it is to be understood that these embodiments are merely illustrative of the application of the principles of the invention. Numerous modifications may be made therein and other arrangements may be devised without departing from the spirit and scope of the invention.

What I claim is:

1. Apparatus for deriving a signal from which the envelope delay characteristic of a transmission channel can be determined comprising means for applying at the send end of the channel a signal consisting of both reference and test carrier frequencies, each modulated by the same modulating signal, the test carrier frequency being variable through that portion of the channel voiceband which is of interest; and means at the receive end of the channel for processing the simultaneously received reference and test carrier frequencies, together with their sidebands, said processing means including first means for tracking said reference carrier frequency and for deriving a signal whose frequency is the same as that of said modulating signal and whose phase is proportional to the derivative of the channel phase-shift at the reference carrier frequency, second means for tracking the variable test carrier frequency and for deriving a signal whose frequency is the same as that of said modulating signal and whose phase is proportional to the derivative of the channel phase-shift at the test carrier frequency, and means for determining the difference between the phases of the two derived signals.

2. Apparatus in accordance with claim 1 wherein said applying means applies to said channel a reference carrier frequency and a signal which is a quadrature modulation thereof, and a test carrier frequency and a signal which is a quadrature modulation thereof.

3. Apparatus in accordance with claim 2 wherein each of said first and second means includes a frequency/phase lock loop for tracking the respective one of said reference and test carrier frequencies, and filter means for filtering out from the respective derived signal all frequencies except that of said modulating signal.

4. Apparatus in accordance with claim 3 wherein said first means has a relatively narrow tracking range and said second means has a relatively wide tracking range.

5. Apparatus in accordance with claim 4 wherein said test carrier frequency is variable through that portion of the channel voiceband of interest but in which there is no transmission of test carrier frequencies which produce low-frequency beats with the reference carrier frequency and its sidebands.

6. Apparatus in accordance with claim 1 wherein each of said first and second means includes a frequency/phase lock loop for tracking the respective one of said reference and test carrier frequencies, and filter means for filtering out from the respective derived signal all frequencies except that of said modulating signal.

7. Apparatus in accordance with claim 6 wherein said first means has a relatively narrow tracking range and said second means has a relatively wide tracking range.

8. Apparatus in accordance with claim 7 wherein said test carrier frequency is variable through that portion of the channel voiceband of interest but in which there is no transmission of test carrier frequencies which produce low-frequency beats with the reference carrier frequency and its sidebands.

9. Apparatus in accordance with claim 1 wherein said test carrier frequency is variable through that portion of the channel voiceband of interest but in which there is no transmission of test carrier frequencies which produce low-frequency beats with the reference carrier frequency and its sidebands.

10. A method for using apparatus which is capable of deriving a signal from which the envelope delay characteristic of a transmission channel can be determined; said apparatus having means for applying at the send end of the channel a signal consisting of both reference and test carrier frequencies, each modulated by the same modulating signal, the test carrier frequency being variable through that portion of the channel voiceband which is of interest; and means at the receive end of the channel for processing the simultaneously received reference and test carrier frequencies, together with their sidebands, said processing means including first means for tracking said reference carrier frequency and for deriving a signal whose frequency is the same as that of said modulating signal and whose phase is proportional to the derivative of the channel phase-shift at the reference carrier frequency, second means for tracking the variable test carrier frequency and for deriving a signal whose frequency is the same as that of said modulating signal and whose phase is proportional to the derivative of the channel phase-shift at the test carrier frequency, and means for determining the difference between the phases of the two derived signals, each of said first and second means including a frequency/phase lock loop for tracking the respective one of said reference and test carrier frequencies, and filter means for filtering out from the respective derived signal all frequencies except that of said modulating signal; said method comprising the steps of using a relatively high frequency reference carrier while varying said test carrier frequency through the lower end of said voiceband, and using a relatively low frequency reference carrier while varying said test carrier frequency through the higher end of said voiceband.

11. A method in accordance with claim 10 further including the step of offsetting the output of said difference determining means after switching from one reference carrier frequency to the other so that the output is the same for both reference carrier frequencies when the same test carrier frequency is transmitted.

12. A method in accordance with claim 10, wherein said apparatus first means has a relatively narrow tracking range and said apparatus second means has a relatively wide tracking range, further including the step of controlling each of said first and second means to acquire its respective carrier frequency at the start of a transmission sequence by first transmitting a test carrier without a reference carrier, the test carrier frequency being relatively far away from the reference carrier frequency to be used, and then adding the reference carrier to the transmitted signal.

13. Apparatus for deriving a signal from which phase-shift data for a transmission channel can be determined comprising means for applying at the send end of the channel a signal consisting of both reference and test carrier frequencies, each modulated by the same modulating signal, the test carrier frequency being variable through that portion of the channel voiceband which is of interest; and means at the receive end of the channel for processing the simultaneously received reference and test carrier frequencies, together with their sidebands, said processing means including first means for operating on said reference carrier frequency and its sidebands to derive a signal whose frequency is the same as that of said modulating signal and whose phase is representative of the channel phase-shift at the reference carrier frequency, second means for operating on the variable test carrier frequency and its sidebands to derive a signal whose frequency is the same as that of said modulating signal and whose phase is representative of the channel phase-shift at the test carrier frequency, and means for determining the difference between the phases of the two derived signals.

14. Apparatus in accordance with claim 13 wherein said applying means applies to said channel a reference carrier frequency and a signal which is a quadrature modulation thereof, and a test carrier frequency and a signal which is a quadrature modulation thereof.

15. Apparatus in accordance with claim 14 wherein each of said first and second means includes a frequency/phase lock loop for tracking the respective one of said reference and test carrier frequencies, and filter means for filtering out from the respective derived signal all frequencies except that of said modulating signal.

16. Apparatus in accordance with claim 15 wherein said first means has a relatively narrow tracking range and said second means has a relatively wide tracking range.

17. Apparatus in accordance with claim 16 wherein said test carrier frequency is variable through that portion of the channel voiceband of interest but in which there is no transmission of test carrier frequencies which produce low-frequency beats with the reference carrier frequency and its sidebands.

18. Apparatus in accordance with claim 13 wherein each of said first and second means includes a frequency/phase lock loop for tracking the respective one of said reference and test carrier frequencies, and filter means for filtering out from the respective derived signal all frequencies except that of said modulating signal.

19. Apparatus in accordance with claim 18 wherein said first means has a relatively narrow tracking range and said second means has a relatively wide tracking range.

20. Apparatus in accordance with claim 19 wherein said test carrier frequency is variable through that portion of the channel voiceband of interest but in which there is no transmission of test carrier frequencies which produce low-frequency beats with the reference carrier frequency and its sidebands.

21. Apparatus in accordance with claim 13 wherein said test carrier frequency is variable through that portion of the channel voiceband of interest but in which there is no transmission of test carrier frequencies which produce low-frequency beats with the reference carrier frequency and its sidebands.

22. A method for using apparatus which is capable of deriving a signal from which phase-shift data for a transmission channel can be determined; said apparatus having means for applying at the send end of the channel a signal consisting of both reference and test carrier frequencies, each modulated by the same modulating signal, the test carrier frequency being variable through that portion of the channel voiceband which is of interest; and means at the receive end of the channel for processing the simultaneously received reference and test carrier frequencies, together with their sidebands, said processing means including first means for operating on said reference carrier frequency and its sidebands to derive a signal whose frequency is the same as that of said modulating signal and whose phase is representative of the channel phase-shift at the reference carrier frequency, second means for operating of the variable test carrier frequency and its sidebands to derive a signal whose frequency is the same as that of said modulating signal and whose phase is representative of the channel phase-shift at the test carrier frequency, and means for determining the difference between the phases of the two derived signals, each of said first and second means including a frequency/phase lock loop for tracking the respective one of said reference and test carrier frequencies, and filter means for filtering out from the respective derived signal all frequencies except that of said modulating signal; said method comprising the steps of using a relatively high frequency reference carrier while varying said test carrier frequency through the lower end of said voiceband, and using a relatively low frequency reference carrier while varying said test carrier frequency through the higher end of said voiceband.

23. A method in accordance with claim 22 further including the step of offsetting the output of said difference determining means after switching from one reference carrier frequency to the other so that the output is the same for both reference carrier frequencies when the same test carrier frequency is transmitted.

24. A method in accordance with claim 22, wherein said apparatus first means has a relatively narrow tracking range and said apparatus second means has a relatively wide tracking range, further including the step of controlling each of said first and second means to acquire its respective carrier frequency at the start of a transmission sequence by first transmitting a test carrier without a reference carrier, the test carrier frequency being relatively far away from the reference carrier frequency to be used, and then adding the reference carrier to the transmitted signal.

25. A method for deriving a signal from which phase shift data for a transmission channel can be determined comprising the steps of applying at the send end of the channel a signal consisting of both reference and test carrier frequencies, each modulated by the same modulating signal, and varying the test carrier frequency through that portion of the channel voiceband which is of interest; and processing the simultaneously received reference and test carrier frequencies, together with their sidebands, at the receive end of the channel, said processing step including the sub-steps of operating on said reference carrier frequency and its sidebands to derive a signal whose frequency is the same as that of said modulating signal and whose phase is representative of the channel phase-shift at the reference carrier frequency, operating on the variable test carrier frequency and its sidebands to derive a signal whose frequency is the same as that of said modulating signal and whose phase is representative of the channel phase-shift at the test carrier frequency, and determining the difference between the phases of the two derived signals.

26. A method in accordance with claim 25 wherein there is applied to said channel a reference carrier frequency and a signal which is a quadrature modulation thereof, and a test carrier frequency and a signal which is a quadrature modulation thereof.

27. A method in accordance with claim 26 wherein the received carrier frequencies are operated upon by tracking the respective reference and test carrier frequencies, and filtering out from the respective derived signals all frequencies except that of said modulating signal.

28. A method in accordance with claim 27 wherein said reference carrier frequency is tracked in a relatively narrow tracking range and said test carrier frequency is tracked in a relatively wide tracking range.

29. A method in accordance with claim 28 wherein said test carrier frequency is varied through that portion of the channel voiceband of interest but in which there is no transmission of test carrier frequencies which produce low-frequency beats with the reference carrier frequency and its sidebands.

30. A method in accordance with claim 25 wherein the received carrier frequencies are operated upon by tracking the respective reference and test carrier frequencies, and filtering out from the respective derived signals all frequencies except that of said modulating signal.

31. A method in accordance with claim 30 wherein said reference carrier frequency is tracked in a relatively narrow tracking range and said test carrier frequency is tracked in a relatively wide tracking range.

32. A method in accordance with claim 31 wherein said test carrier frequency is varied through that portion of the channel voiceband of interest but in which there is no transmission of test carrier frequencies which produce low-frequency beats with the reference carrier frequency and its sidebands.

33. A method in accordance with claim 25 wherein said test carrier frequency is varied through that portion of the channel voiceband of interest but in which there is no transmission of test carrier frequencies which produce low-frequency beats with the reference carrier frequency and its sidebands.

34. A method in accordance with claim 25 wherein a relatively high reference carrier frequency is used while varying said test carrier frequency through the lower end of said voiceband, and a relatively low reference carrier frequency is used while varying said test carrier frequency through the higher end of said voiceband.

35. A method in accordance with claim 34 further including the step of offsetting the difference determined between the phases of the two derived signals after switching from one reference carrier frequency to the other so that the difference is the same for both reference carrier frequencies when the same test carrier frequency is transmitted.

36. A method in accordance with claim 28 further including the step of controlling the acquisitions of the carrier frequencies at the start of a transmission sequence by first transmitting a test carrier without a reference carrier, the test carrier frequency being relatively far away from the reference carrier frequency to be used, and then adding the reference carrier to the transmitted signal.

37. Apparatus connectable to the receive end of a transmission channel for deriving phase-shift information for the channel from signals applied to the send end of the channel, said signals consisting of simultaneously transmitted reference and test carrier frequencies, each modulated by the same modulating signal, the test carrier frequency being variable through that portion of the channel voiceband which is of interest; comprising first means for operating on the received reference carrier frequency and its sidebands to derive a signal whose frequency is the same as that of said modulating signal and whose phase is representative of the channel phase-shift at the reference carrier frequency, second means for operating on the received variable test carrier frequency and its sidebands to derive a signal whose frequency is the same as that of said modulating signal and whose phase is representative of the channel phase-shift at the test carrier frequency, and means for determining the difference between the phases of the two derived signals.

38. Apparatus in accordance with claim 37 wherein the signals applied to said channel consist of a reference carrier frequency and a signal which is a quadrature modulation thereof, and a test carrier frequency and a signal which is a quadrature modulation thereof.

39. Apparatus in accordance with claim 38 wherein each of said first and second means includes a frequency/phase lock loop for tracking the respective one of said reference and test carrier frequencies, and filter means for filtering out from the respective derived signal all frequencies except that of said modulating signal.

40. Apparatus in accordance with claim 39 wherein said first means has a relatively narrow tracking range and said second means has a relatively wide tracking range.

41. Apparatus in accordance with claim 40 wherein said test carrier frequency is variable through that portion of the channel voiceband of interest but in which there is no transmission of test carrier frequencies which produce low-frequency beats with the reference carrier frequency and its sidebands.

42. Apparatus in accordance with claim 37 wherein each of said first and second means includes a frequency/phase lock loop for tracking the respective one of said reference and test carrier frequencies, and filter means for filtering out from the respective derived signal all frequencies except that of said modulating signal.

43. Apparatus in accordance with claim 42 wherein said first means has a relatively narrow tracking range and said second means has a relatively wide tracking range.

44. Apparatus in accordance with claim 43 wherein said test carrier frequency is variable through that portion of the channel voiceband of interest but in which there is no transmission of test carrier frequencies which produce low-frequency beats with the reference carrier frequency and its sidebands.

45. Apparatus in accordance with claim 37 wherein said test carrier frequency is variable through that portion of the channel voiceband of interest but in which there is no transmission of test carrier frequencies which produce low-frequency beats with the reference carrier frequency and its sidebands.

46. Apparatus for deriving a signal from which the envelope delay characteristic of a transmission channel can be determined comprising means for applying at the send end of the channel a signal consisting of both reference and test carrier frequencies together, each modulated by the same modulating signal, the test carrier frequency being variable through that portion of the channel voiceband which is of interest; and means at the receive end of the channel for processing the overall received signal having components consisting of reference and test carrier frequencies, together with their sidebands, said processing means including means for tracking the received reference carrier frequency to generate a signal having the same frequency and for deriving a first signal whose frequency is the same as that of said modulating signal and whose phase is representative of the channel phase-shift at the reference carrier frequency, means for operating on the overall received signal and the generated signal to derive therefrom a second signal representative of the received test carrier frequency with its sidebands, and means for operating on said first derived signal and said second derived signal to derive a third signal representative of the envelope delay at the test carrier frequency.

47. Apparatus in accordance with claim 46 wherein said applying means applies to said channel a reference carrier frequency and a signal which is a quadrature modulation thereof, and a test carrier frequency and a signal which is an amplitude modulation thereof.

48. Apparatus in accordance with claim 47 wherein said test carrier frequency is variable through that portion of the channel voiceband of interest but in which there is no transmission of test carrier frequencies which produce low-frequency beats with the reference carrier frequency and its sidebands.

49. Apparatus in accordance with claim 46 wherein said test carrier frequency is variable through that portion of the channel voiceband of interest but in which there is no transmission of test carrier frequencies which produce low-frequency beats with the reference carrier frequency and its sidebands.

50. A method for using apparatus which is capable of deriving a signal from which the envelope delay characteristic of a transmission channel can be determined; said apparatus having means for applying at the send end of the channel a signal consisting of both reference and test carrier frequencies, each modulated by the same modulating signal, the test carrier frequency being variable through that portion of the channel voiceband which is of interest; and means at the receive end of the channel for processing the simultaneously received reference and test carrier frequencies, together with their sidebands, said processing means including means for tracking the received reference carrier frequency to generate a signal having the same frequency and for deriving a first signal whose frequency is the same as that of said modulating signal and whose phase is representative of the channel phase-shift at the reference carrier frequency, means for operating on the overall received signal and the generated signal to derive therefrom a second signal representative of the received test carrier frequency with its sidebands, and means for operating on said first derived signal and said second derived signal to derive a third signal representative of the envelope delay at the test carrier frequency; said method comprising the steps of using a relatively high frequency reference carrier while varying said test carrier frequency through the lower end of said voiceband, and using a relatively low frequency reference carrier while varying said test carrier frequency through the higher end of said voiceband.

51. A method in accordance with claim 50 further including the step of offsetting the output of said operating means after switching from one reference carrier frequency to the other so that the output is the same for both reference carrier frequencies when the same test carrier frequency is transmitted.

52. A method for deriving a signal from which phase shift data for a transmission channel can be determined comprising the steps of applying at the send end of the channel a signal consisting of both reference and test carrier frequencies, each modulated by the same modulating signal, and varying the test carrier frequency through that portion of the channel voiceband which is of interest; and processing the simultaneously received reference and test carrier frequencies, together with their sidebands, at the receive end of the channel, said processing step including the sub-steps of operating on the received signal to derive a signal whose frequency is the same as that of said modulating signal and whose phase is representative of the channel phase-shift at the reference carrier frequency, operating on the received signal to extract therefrom the received test carrier component with its sidebands, and determining phase shift data at the test carrier frequency from said derived and extracted signals.

53. A method in accordance with claim 52 wherein there is applied to said channel a reference carrier frequency and a signal which is a quadrature modulation thereof, and a test carrier frequency and a signal which is an amplitude modulation thereof.

54. A method in accordance with claim 53 wherein said test carrier frequency is varied through that portion of the channel voiceband of interest but in which there is no transmission of test carrier frequencies which produce low-frequency beats with the reference carrier frequency and its sidebands.

55. A method in accordance with claim 52 wherein said test carrier frequency is varied through that portion of the channel voiceband of interest but in which there is no transmission of test carrier frequencies which produce low-frequency beats with the reference carrier frequency and its sidebands.

56. A method in accordance with claim 52 wherein a relatively high frequency reference carrier is used while varying said test carrier frequency through the lower end of said voiceband, and a relatively low frequency reference carrier is used while varying said test carrier frequency through the higher end of said voiceband.

57. Apparatus connectable to the receive end of a transmission channel for deriving phase-shift information for the channel from signals applied to the send end of the channel, said signals consisting of simultaneously transmitted reference and test carrier frequencies, each modulated by the same modulating signal, the test carrier frequency being variable through that portion of the channel voiceband which is of interest; comprising first means for operating on the received reference carrier frequency and its sidebands to derive a signal whose frequency is the same as that of said modulating signal and whose phase is representative of the channel phase-shift at the reference carrier frequency, second means for operating on the overall received signal to derive a signal which is the same as the received test carrier frequency and its sidebands, and means for determining phase-shift information from the signals derived by said first and second means.

58. Apparatus in accordance with claim 57 wherein the signals applied to said channel consist of a reference carrier frequency and a signal which is a quadrature modulation thereof, and a test carrier frequency and a signal which is an amplitude modulation thereof.

59. Apparatus in accordance with claim 58 wherein said test carrier frequency is variable through that portion of the channel voiceband of interest but in which there is no transmission of test carrier frequencies which produce low-frequency beats with the reference carrier frequency and its sidebands.

60. Apparatus in accordance with claim 57 wherein said test carrier frequency is variable through that portion of the channel voiceband of interest but in which there is no transmission of test carrier frequencies which produce low-frequency beats with the reference carrier frequency and its sidebands.

61. Apparatus for deriving a signal from which the envelope delay characteristic of a transmission channel can be determined comprising means for applying at the send end of the channel a signal consisting of both reference and test carrier frequencies together, each modulated by the same modulating signal, the test carrier frequency being variable through that portion of the channel voiceband which is of interest; and means at the receive end of the channel for processing the overall received signal having components consisting of reference and test carrier frequencies, together with their sidebands, said processing means including means for operating on the overall received signal to derive a first signal representative of the channel phase shift at the reference carrier frequency, means for operating on the overall received signal to derive a second signal representative of the channel phase shift at the test carrier frequency, and means for operating on said first derived signal and said second derived signal to derive a third signal representative of the envelope delay at the test carrier frequency.

62. Apparatus in accordance with claim 61 wherein said applying means applies to said channel a reference carrier frequency and a signal which is a quadrature modulation thereof, and a test carrier frequency and a signal which is a quadrature modulation thereof.

63. Apparatus in accordance with claim 61 wherein said applying means applies to said channel a reference carrier frequency and a signal which is a quadrature modulation thereof, and a test carrier frequency and a signal which is an amplitude modulation thereof.

64. Apparatus in accordance with claim 61 whrein said test carrier frequency is variable through that portion of the channel voiceband of interest but in which there is no transmission of test carrier frequencies which produce low-frequency beats with the reference carrier frequency and its sidebands.

65. A method for using apparatus which is capable of deriving a signal from which the envelope delay characteristic of a transmission channel can be determined; said apparatus having means for applying at the send end of the channel a signal consisting of both reference and test carrier frequencies, each modulated by the same modulating signal, the test carrier frequency being variable through that portion of the channel voiceband which is of interest; and means at the receive end of the channel for processing the simultaneously received reference and test carrier frequencies, together with their sidebands, said processing means including means for operating on the overall received signal to derive a first signal representative of the channel phase-shift at the reference carrier frequency, means for operating on the overall received signal to derive a second signal representative of the channel phase-shift at the test carrier frequency, and means for operating on said first derived signal and said second derived signal to derive a third signal representative of the envelope delay at the test carrier frequency; said method comprising the steps of using a relatively high frequency reference carrier while varying said test carrier frequency through the lower end of said voiceband, and using a relatively low frequency reference carrier while varying said test carrier frequency through the higher end of said voiceband.

66. A method in accordance with claim 65 further including the step of offsetting the output of said operating means after switching from one reference carrier frequency to the other so that the output is the same for both reference carrier frequencies when the same test carrier frequency is transmitted.

67. A method for deriving a signal from which phase shift data for a transmission channel can be determined comprising the steps of applying at the send end of the channel a signal consisting of both reference and test carrier frequencies, each modulated by the same modulating signal, and varying the test carrier frequency through that portion of the channel voiceband which is of interest; and processing the simultaneously received reference and test carrier frequencies, together with their sidebands, at the receive end of the channel, said processing step including the sub-steps of operating on the received signal to derive a first signal representative of the channel phase-shift at the reference carrier frequency, operating on the received signal to derive a second signal representative of the channel phase-shift at the test carrier frequency, and determining phase shift data at the test carrier frequency from said first and second signals.

68. A method in accordance with claim 67 wherein there is applied to said channel a reference carrier frequency and a signal which is a quadrature modulation thereof, and a test carrier frequency and a signal which is a quadrature modulation thereof.

69. A method in accordance with claim 67 wherein there is applied to said channel a reference carrier frequency and a signal which is a quadrature modulation thereof, and a test carrier frequency and a signal which is an amplitude modulation thereof.

70. A method in accordance with claim 67 wherein said test carrier frequency is varied through that portion of the channel voiceband of interest but in which there is no transmission of test carrier frequencies which produce low-frequency beats with the reference carrier frequency and its sidebands.

71. A method in accordance with claim 67 wherein a relatively high frequency reference carrier is used while varying said test carrier frequency through the lower end of said voiceband, and a relatively low frequency reference carrier is used while varying said test carrier frequency through the higher end of said voiceband.

72. Apparatus connectable to the receive end of a transmission channel for deriving phase-shift information for the channel from signals applied to the send end of the channel, said signals consisting of simultaneously transmitted reference and test carrier frequencies, each modulated by the same modulating signal, the test carrier frequency being variable through that portion of the channel voiceband which is of interest; comprising means for operating on the received signal to derive a first signal representative of the channel phase shift at the reference carrier frequency, means for operating on the received signal to derive a second signal representative of the channel phase shift at the test carrier frequency, and means for determining relative phase shift information from said first and second derived signals.

* * * * *